(12) United States Patent
Bae et al.

(10) Patent No.: US 10,289,644 B2
(45) Date of Patent: May 14, 2019

(54) METHOD FOR GENERATING DATABASE USING LOOKUP TABLE

(71) Applicant: AGENCY FOR DEFENSE DEVELOPMENT, Daejeon (KR)

(72) Inventors: Seung-Ho Bae, Daejeon (KR); Sang-Jin Kim, Sejong (KR)

(73) Assignee: AGENCY FOR DEFENSE DEVELOPMENT, Daejeon (KR)

(*) Notice: Subject to any disclaimer, the term of this patent is extended or adjusted under 35 U.S.C. 154(b) by 272 days.

(21) Appl. No.: 15/341,232

(22) Filed: Nov. 2, 2016

(65) Prior Publication Data
US 2017/0124215 A1    May 4, 2017

(30) Foreign Application Priority Data
Nov. 4, 2015 (KR) .................. 10-2015-0154502

(51) Int. Cl.
| G06F 16/00 | (2019.01) |
| G06F 16/901 | (2019.01) |
| G06F 16/22 | (2019.01) |

(52) U.S. Cl.
CPC ........ *G06F 16/9017* (2019.01); *G06F 16/221* (2019.01); *G06F 16/2282* (2019.01)

(58) Field of Classification Search
CPC ......... G06F 17/30952; G06F 17/30315; G06F 17/30339; G06F 17/30; G06F 17/30613; G06F 17/30622; G06F 17/30628; G06F 17/2217; G06F 16/9017; G06F 16/2282; G06F 16/221; G06F 16/901; G06F 16/22; G06F 16/00; G11C 16/08; G06Q 50/20; G06Q 40/08; H03K 19/17728; H03M 7/46

See application file for complete search history.

(56) References Cited

U.S. PATENT DOCUMENTS

| 5,742,738 A * | 4/1998 | Koza ................. G06N 3/126 706/13 |
| 6,035,303 A | 3/2000 | Baer et al. |
| 6,202,070 B1 * | 3/2001 | Nguyen ................ G06F 8/61 707/999.107 |
| 6,246,678 B1 * | 6/2001 | Erb .................... H04M 3/4228 370/352 |
| 8,386,456 B1 * | 2/2013 | Paiz ................. G06F 17/30864 707/706 |
| 8,954,461 B2 | 2/2015 | Ware et al. |

(Continued)

FOREIGN PATENT DOCUMENTS

| JP | H07-262018 A | 10/1995 |
| JP | H10-78908 A | 3/1998 |

(Continued)

OTHER PUBLICATIONS

Search Report dated Aug. 24, 2017, in Swedish Patent Appl'n No. 1651437-4.

*Primary Examiner* — Anh Ly
(74) *Attorney, Agent, or Firm* — LRK Patent Law Firm (57) ABSTRACT

A method for generating an engineering database using lookup tables includes creating multiple table sets for generating the engineering database, inputting multiple pieces of control information for controlling respective ones of the multiple datasets, and inputting multiple lookup tables corresponding to each of the multiple pieces of control information.

6 Claims, 13 Drawing Sheets

(56) References Cited

U.S. PATENT DOCUMENTS

| | | | |
|---|---|---|---|
| 2002/0129348 A1* | 9/2002 | Kerpan | G06F 16/289 |
| | | | 717/170 |
| 2003/0041063 A1* | 2/2003 | Brady | G06Q 10/00 |
| | | | 707/999.01 |
| 2005/0216503 A1* | 9/2005 | Charlot | G06Q 50/22 |
| | | | 707/E17.005 |
| 2006/0129691 A1* | 6/2006 | Coffee | H04L 67/04 |
| | | | 709/230 |
| 2007/0081182 A1* | 4/2007 | Shiohara | H04N 1/64 |
| | | | 358/1.13 |
| 2007/0101231 A1* | 5/2007 | Kutz | H03M 13/271 |
| | | | 714/755 |
| 2007/0156670 A1* | 7/2007 | Lim | G06F 21/6218 |
| | | | 707/999.004 |
| 2007/0168060 A1* | 7/2007 | Nixon | G06F 9/4488 |
| | | | 700/83 |
| 2012/0278249 A1* | 11/2012 | Duggal | G06Q 40/08 |
| | | | 705/325 |
| 2014/0172916 A1 | 6/2014 | Vermette | |
| 2015/0026141 A1 | 1/2015 | Blanco et al. | |
| 2015/0234870 A1 | 8/2015 | Kumar et al. | |
| 2016/0004742 A1* | 1/2016 | Mohan | G06F 17/30371 |
| | | | 707/694 |

FOREIGN PATENT DOCUMENTS

| | | |
|---|---|---|
| KR | 10-2004-0077918 A | 9/2004 |
| WO | 2004114148 A1 | 12/2004 |

* cited by examiner

```
!------ input for DB lookup ------
! nivar, ndvar :: no. of independent/dependent variables          NUMBER OF INDEPENDENT VARIABLES,
  4     6                                                         NUMBER OF DEPENDENT VARIABLES
! name_ivar(1:nivar) and name_dvar(1:ndvar)                       NAMES OF INDEPENDENT VARIABLES,
  geo M  AT  phi  CA CY CN Crm Cpm Cym                            NAMES OF DEPENDENT VARIABLES
! nset :: no._ of total data set                                  TOTAL NUMBER OF LOOKUP TABLES
  216
! nvar_infile, nvar_sel :: var. number of inside data_table & selected var.
  8     7                                                         NUMBER OF COLUMNS
                                                                  IN LOOKUP TABLE
! ivar_sel(1:nvar_sel) :: column numbers of last vi and vd        COLUMN NUMBERS OF COLUMNS SELECTED
  2 3 4 5 6 7 8                                                   IN ORDER TO GENERATE DATABASE
! data table name :: using order of independent variables
! ivar(1:nivar−1)    data_table(1:nset)
```

FIG.3C

| 0.0 | 0.60 | 0.0 | gro00_n060_A000.dat |
| 0.0 | 0.60 | 0.2 | gro00_n060_A002.dat |
| 0.0 | 0.60 | 2.0 | gro00_n060_A020.dat |
| 0.0 | 0.60 | 4.0 | gro00_n060_A040.dat |
| 0.0 | 0.60 | 6.0 | gro00_n060_A060.dat |
| 0.0 | 0.60 | 8.0 | gro00_n060_A080.dat |
| 0.0 | 0.60 | 12.0 | gro00_n060_A120.dat |
| 0.0 | 0.60 | 16.0 | gro00_n060_A160.dat |
| 0.0 | 0.60 | 20.0 | gro00_n060_A200.dat |
| 0.0 | 0.60 | 25.0 | gro00_n060_A250.dat |
| 0.0 | 0.60 | 30.0 | gro00_n060_A300.dat |
| 0.0 | 0.70 | 0.0 | gro00_n070_A000.dat |
| 0.0 | 0.70 | 0.2 | gro00_n070_A002.dat |
| 0.0 | 0.70 | 2.0 | gro00_n070_A020.dat |
| 0.0 | 0.70 | 4.0 | gro00_n070_A040.dat |
| 0.0 | 0.70 | 6.0 | gro00_n070_A060.dat |
| 0.0 | 0.70 | 8.0 | gro00_n070_A080.dat |
| 0.0 | 0.70 | 12.0 | gro00_n070_A120.dat |
| 0.0 | 0.70 | 16.0 | gro00_n070_A160.dat |
| 0.0 | 0.70 | 20.0 | gro00_n070_A200.dat |
| 0.0 | 0.70 | 25.0 | gro00_n070_A250.dat |
| 0.0 | 0.70 | 30.0 | gro00_n070_A300.dat |
| 0.0 | 0.80 | 0.0 | gro00_n080_A000.dat |
| 0.0 | 0.80 | 0.2 | gro00_n080_A002.dat |
| 0.0 | 0.80 | 2.0 | gro00_n080_A020.dat |
| ⋮ | | | |
| 60.0 | 0.85 | 4.0 | gro60_n085_A040.dat |
| 60.0 | 0.85 | 6.0 | gro60_n085_A060.dat |
| 60.0 | 0.85 | 8.0 | gro60_n085_A080.dat |
| 60.0 | 0.85 | 12.0 | gro60_n085_A120.dat |
| 60.0 | 0.85 | 16.0 | gro60_n085_A160.dat |
| 60.0 | 0.85 | 20.0 | gro60_n085_A200.dat |
| 60.0 | 0.85 | 25.2 | gro60_n085_A250.dat |
| 60.0 | 0.85 | 30.0 | gro60_n085_A300.dat |

VALUES OF INDEPENDENT VARIABLES, (0.0, 0.60, 0.0), AND NAME OF LOOKUP TABLE CORRESPONDING THERETO, geo00_m060_A000.dat

FIG.4A

| COLUMN NUMBER: | 1 | 2 | 3 |
|---|---|---|---|
| | ↓ | ↓ | ↓ |
| | AT(deg) | Phi | CA |
| | 0.279760E-01 | -0.180000E-03 | 0.343997E-01 |
| | 0.279760E-01 | -0.172447E-03 | 0.343578E-01 |
| | 0.342640E-01 | -0.163895E-03 | 0.344267E-01 |
| | 0.279760E-01 | -0.155417E-03 | 0.343282E-01 |
| | 0.279760E-01 | -0.146824E-03 | 0.343517E-01 |
| | 0.279760E-01 | -0.138435E-03 | 0.346860E-01 |
| | 0.342640E-01 | -0.129894E-03 | 0.344559E-01 |
| | 0.342640E-01 | -0.121401E-02 | 0.345626E-01 |
| | 0.442350E-01 | -0.112884E-03 | 0.347599E-01 |
| | 0.484570E-01 | -0.104928E-03 | 0.347379E-01 |
| | 0.484570E-01 | -0.971836E-02 | 0.343961E-01 |
| | 0.442350E-01 | -0.897049E-02 | 0.346639E-01 |
| | 0.342640E-01 | -0.823964E-02 | 0.349147E-01 |
| | 0.559530E-01 | -0.750810E-02 | 0.347428E-01 |
| | 0.442350E-01 | -0.677810E-02 | 0.347103E-01 |
| | 0.442350E-01 | -0.605766E-02 | 0.346469E-01 |
| | 0.559530E-01 | -0.534193E-02 | 0.344866E-01 |
| | 0.484570E-01 | -0.462282E-02 | 0.344773E-01 |
| | 0.395650E-01 | -0.390793E-02 | 0.345670E-01 |
| | 0.395650E-01 | -0.318202E-02 | 0.344909E-01 |
| | 0.395650E-01 | -0.247140E-02 | 0.346868E-01 |
| | 0.395650E-01 | -0.176496E-02 | 0.346452E-01 |
| | 0.342640E-01 | -0.104227E-02 | 0.345980E-01 |
| | 0.279760E-01 | -0.328949E-02 | 0.346355E-01 |

| | | |
|---|---|---|
| 0.279760E-01 | 0.498699E+01 | 0.346387E-01 |
| 0.197820E-01 | 0.132611E+03 | 0.344761E-01 |
| 0.197820E-01 | 0.140969E+03 | 0.347302E-01 |
| 0.279760E-01 | 0.149523E+03 | 0.346095E-01 |
| 0.279760E-01 | 0.158056E+03 | 0.345027E-01 |
| 0.342640E-01 | 0.166581E+03 | 0.343789E-01 |
| 0.342640E-01 | 0.168001E+03 | 0.344341E-01 |
| 0.342640E-01 | 0.169353E+03 | 0.344732E-01 |
| 0.342640E-01 | 0.170773E+03 | 0.344427E-01 |
| 0.442350E-01 | 0.172207E+03 | 0.344304E-01 |
| 0.442350E-01 | 0.173646E+03 | 0.343576E-01 |
| 0.484570E-01 | 0.175066E+03 | 0.344677E-01 |
| 0.523390E-01 | 0.176383E+03 | 0.344674E-01 |
| 0.559530E-01 | 0.177792E+03 | 0.344139E-01 |
| 0.442350E-01 | 0.179214E+03 | 0.344182E-01 |
| 0.442350E-01 | 0.180000E+03 | 0.344182E-01 |

FIG.4C

| | 4 | | 5 | | 6 | |
|---|---|---|---|---|---|---|
| | ↓ | | ↓ | | ↓ | |

| CS | CN | Crm |
|---|---|---|
| −0.882079E−02 | 0.332328E−02 | 0.155440E−03 |
| −0.825444E−02 | 0.319001E−02 | 0.192478E−03 |
| −0.802653E−02 | 0.441448E−02 | 0.198934E−03 |
| −0.841548E−02 | 0.187346E−03 | 0.195673E−03 |
| −0.538007E−02 | 0.170051E−02 | 0.215028E−03 |
| −0.882924E−02 | 0.436494E−03 | 0.185767E−03 |
| −0.706316E−02 | −0.116832E−02 | 0.193193E−03 |
| −0.502707E−02 | −0.189642E−02 | 0.209425E−03 |
| −0.607516E−02 | −0.308329E−02 | 0.182606E−03 |
| −0.208963E−02 | −0.168377E−02 | 0.188873E−03 |
| −0.275071E−02 | −0.316745E−02 | 0.182933E−03 |
| −0.287872E−02 | −0.362210E−02 | 0.178195E−03 |
| −0.236113E−02 | −0.678746E−02 | 0.170459E−03 |
| −0.114305E−02 | −0.618991E−02 | 0.185375E−03 |
| −0.140037E−02 | −0.581444E−02 | 0.168179E−03 |
| −0.130622E−02 | −0.475510E−02 | 0.167258E−03 |
| −0.332025E−02 | −0.587420E−02 | 0.180555E−03 |
| −0.356997E−02 | −0.312442E−02 | 0.165557E−03 |
| −0.403317E−02 | −0.281604E−02 | 0.153041E−03 |
| −0.282574E−02 | −0.156378E−02 | 0.149972E−03 |
| −0.383707E−02 | −0.216026E−02 | 0.156690E−03 |
| −0.650682E−02 | −0.113673E−02 | 0.172164E−03 |
| −0.758243E−02 | −0.422579E−02 | 0.183117E−03 |
| −0.791067E−02 | −0.111714E−02 | 0.191689E−03 |

| | | |
|---|---|---|
| 0.798128E-02 | 0.286240E-02 | 0.178345E-03 |
| -0.400962E-02 | 0.106208E-01 | 0.192035E-03 |
| -0.471408E-02 | 0.959422E-02 | 0.191698E-03 |
| -0.595369E-02 | 0.801896E-02 | 0.201679E-03 |
| -0.809479E-02 | 0.753243E-02 | 0.192950E-03 |
| -0.679609E-02 | 0.640171E-02 | 0.234198E-03 |
| -0.655139E-02 | 0.555552E-02 | 0.239906E-03 |
| -0.664183E-02 | 0.519470E-02 | 0.231374E-03 |
| -0.690054E-02 | 0.467532E-02 | 0.218890E-03 |
| -0.699089E-02 | 0.422718E-02 | 0.211741E-03 |
| -0.757896E-02 | 0.405422E-02 | 0.200432E-03 |
| -0.825428E-02 | 0.436792E-02 | 0.188693E-03 |
| -0.884422E-02 | 0.419160E-02 | 0.193722E-03 |
| -0.858557E-02 | 0.452529E-02 | 0.218376E-03 |
| -0.735889E-02 | 0.373885E-02 | 0.228914E-03 |
| -0.735889E-02 | 0.373885E-02 | 0.228914E-03 |

FIG.4E

|  7 | 8 |
|---|---|
| Cpm | Cym |
| 0.771033E-02 | 0.122858E-03 |
| 0.775212E-02 | 0.127605E-03 |
| 0.535414E-02 | 0.125122E-02 |
| 0.165044E-01 | 0.129333E-02 |
| 0.127028E-01 | 0.928875E-03 |
| 0.159532E-01 | 0.126331E-02 |
| 0.216241E-01 | 0.100887E-02 |
| 0.237004E-01 | 0.800569E-03 |
| 0.258511E-01 | 0.831631E-03 |
| 0.217916E-01 | 0.280533E-03 |
| 0.244440E-01 | 0.364114E-03 |
| 0.249433E-01 | 0.352573E-03 |
| 0.321293E-01 | 0.259233E-03 |
| 0.306580E-01 | 0.199060E-03 |
| 0.291427E-01 | 0.238921E-03 |
| 0.266559E-01 | 0.231129E-03 |
| 0.293172E-01 | 0.457809E-03 |
| 0.231852E-01 | 0.535695E-03 |
| 0.226077E-01 | 0.621911E-03 |
| 0.195072E-01 | 0.459507E-03 |
| 0.196961E-01 | 0.552978E-03 |
| 0.166783E-01 | 0.848012E-03 |
| 0.120148E-01 | 0.966774E-03 |
| 0.100534E-01 | 0.941583E-03 |

| | |
|---|---|
| 0.618181E-02 | -0.973266E-03 |
| -0.978488E-02 | 0.873000E-03 |
| -0.651184E-02 | 0.914867E-03 |
| -0.273670E-02 | 0.109506E-02 |
| -0.713911E-02 | 0.136379E-02 |
| 0.142526E-02 | 0.130292E-02 |
| 0.307611E-02 | 0.127711E-02 |
| 0.404878E-02 | 0.124397E-02 |
| 0.489942E-02 | 0.121097E-02 |
| 0.530919E-02 | 0.119201E-02 |
| 0.540853E-02 | 0.122197E-02 |
| 0.527316E-02 | 0.129758E-02 |
| 0.560345E-02 | 0.140868E-02 |
| 0.609636E-02 | 0.148091E-02 |
| 0.741895E-02 | 0.134006E-02 |
| 0.741895E-02 | 0.134006E-02 |

FIG.5

METHOD FOR GENERATING DATABASE USING LOOKUP TABLE

CROSS-REFERENCE TO RELATED APPLICATION(S)

This application claims priority to Korean Patent Application No 10-2015-0154502, filed Nov. 4, 2015, the disclosure of which is incorporated herein by reference for all purposes.

BACKGROUND OF THE INVENTION

1. Technical Field

The present invention relates generally to a method for generating a database and, more particularly, to a method for generating an engineering database using lookup tables. In particular, the method relates to the degree of freedom in the kind and number of independent variables.

2. Description of Related Art

When a database is generated using lookup tables, the structure of the lookup table becomes more complicated with an increase in the number of independent variables, and thus the generation of the database is time-consuming. Also, it is problematic in that it is necessary to generate different respective databases for various kinds of independent variables.

Meanwhile, an engineering database is configured such that lookup tables therein contain numeric data and such that the amount of data increases with an increase in the number of independent variables.

SUMMARY OF THE INVENTION

Accordingly, the present invention has been made keeping in mind the above problem occurring in the conventional art, and an object of the present invention is to provide a method for generating an engineering database that is capable of flexibly responding to the kind and number of independent variables when the database is generated based on lookup tables.

Another object of the present invention is to provide a method for generating an engineering database that has no limitation as to the find and number of independent variables.

In order to accomplish the above object, the present invention provides a method for generating an engineering database capable of flexibly responding to the kind and number of independent variables when the database is generated based on lookup tables.

The method or generating an engineering database using lookup tables may include creating multiple table sets for generating an engineering database; inputting multiple pieces of control information for controlling respective ones of the multiple table sets; and inputting multiple lookup tables corresponding to each of the multiple pieces of control information.

Here, the multiple lookup tables may show data values for a change in a single independent variable.

Also, primary input information in which the multiple pieces or control information are aggregated may be presented in a first level.

Also, secondary input information including each of the multiple pieces of control information for controlling each of the multiple table sets may be presented in a second level.

Also, each of the lookup tables may use dependent variable values for a change in the single independent variable.

Also, the primary input information may include a number of the multiple table sets included in the engineering database and names for referring to respective pieces of the control information included in the engineering database.

Also, in the second level, values of remaining independent variables, excluding the single independent variable included in the multiple lookup tables, may be arranged along with names of the lookup tables in order to enable the multiple lookup tables to be sorted.

Also, the secondary input information may include a number of columns contained in the lookup table, a number of columns selected from among the columns contained in the lookup table, and column numbers of the selected columns.

Also, the secondary input information may include independent variables, a number and names of variables dependent on the independent variables, and a number of the multiple lookup tables.

Also, each of the multiple lookup tables may be configured with a combination of input information for the independent variables and a name of the lookup table corresponding to the independent variables.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Because the present invention may be variously changed and may have various embodiments, specific embodiments will be described in detail below with reference to the attached drawings. However, it should be understood that those embodiments are not intended to limit the present invention to specific disclosure forms but include all changes, equivalents or modifications included in the spirit and scope of the present invention.

It should be noted that the same reference numerals are used to designate the same or similar elements throughout the drawings.

While terms such as "first" and "second", etc., may be used to describe various components, such components must not be understood as being limited to the above terms. The above terms are used only to distinguish one component from another.

For, example, a first component may be referred to as a second component without departing from the rights of the present invention, and likewise a second component may be referred to as a first component. The term "and/or" should be understood as including all combinations that can be made from one or more relevant items.

Unless differently defined, all terms used here including technical or terms have the same meanings as terms generally understood by those skilled in the an the present invention pertains.

Terms identical to those defined in generally used dictionaries should be interpreted as having meanings identical to contextual meanings of the related art, and are not to be interpreted as having ideal or excessively formal meanings unless they are definitely defined in the present specification.

Hereinafter, a method for generating a database using lookup tables according to an embodiment of the present invention will be described in detail with reference to the accompanying drawings.

Figure 1:
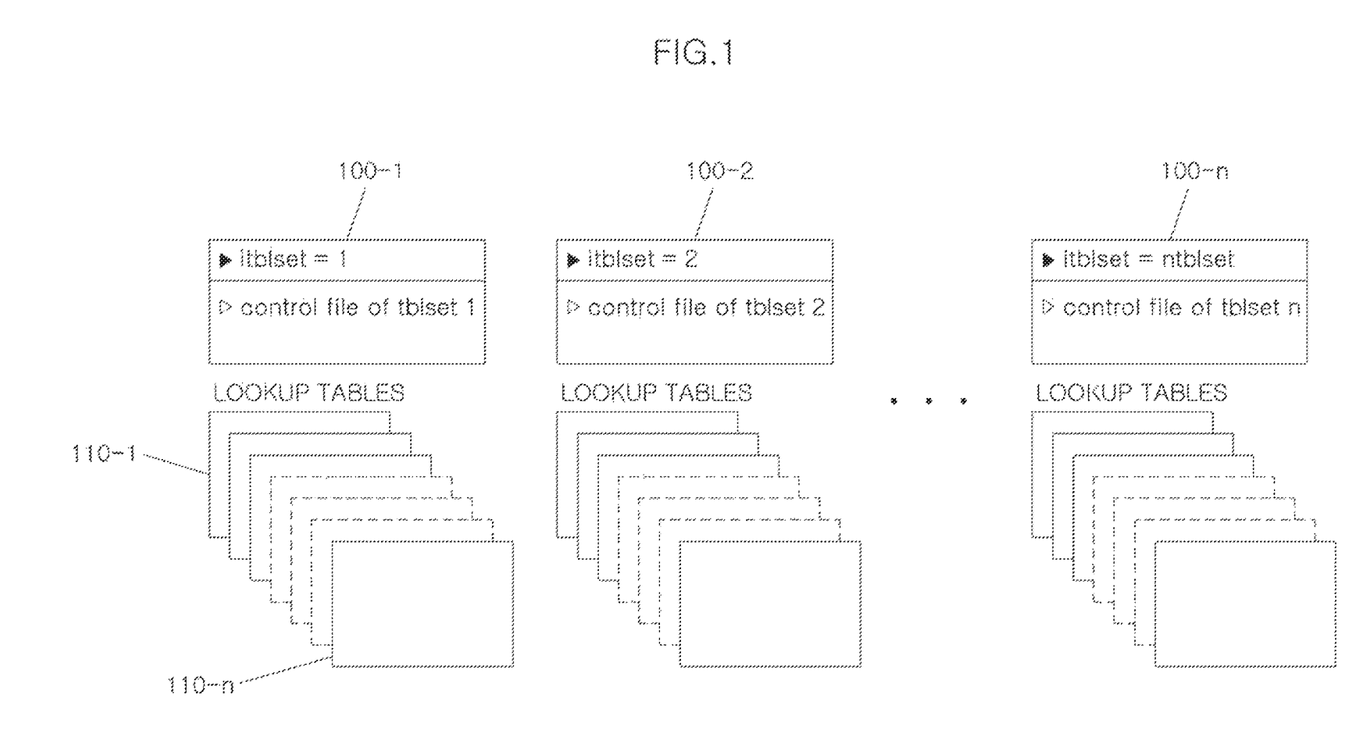
FIG. 1 is a concept diagram that shows the structure of data in a database according to an embodiment of the present invention.

FIG. 1 is a concept diagram that shows the structure of data in a database according to an embodiment of the present invention. Specifically, FIG. 1 shows a hierarchical data structure in the database. Referring to FIG. 1, the database includes n table sets from a first table set 100-1 to an n-th table set 100-n. In other words, the database includes table sets, which are referred to as itblset=1, itblset=2, . . . , itblset=n, and for each of the table sets, information about the data structure thereof and lookup tables 110-1 to 110-n may be configured as separate control information, which is referred to as a control file of tblset 1, . . . , a control file of tblset n. Here, "itblset" denotes a table set.

Figure 2:
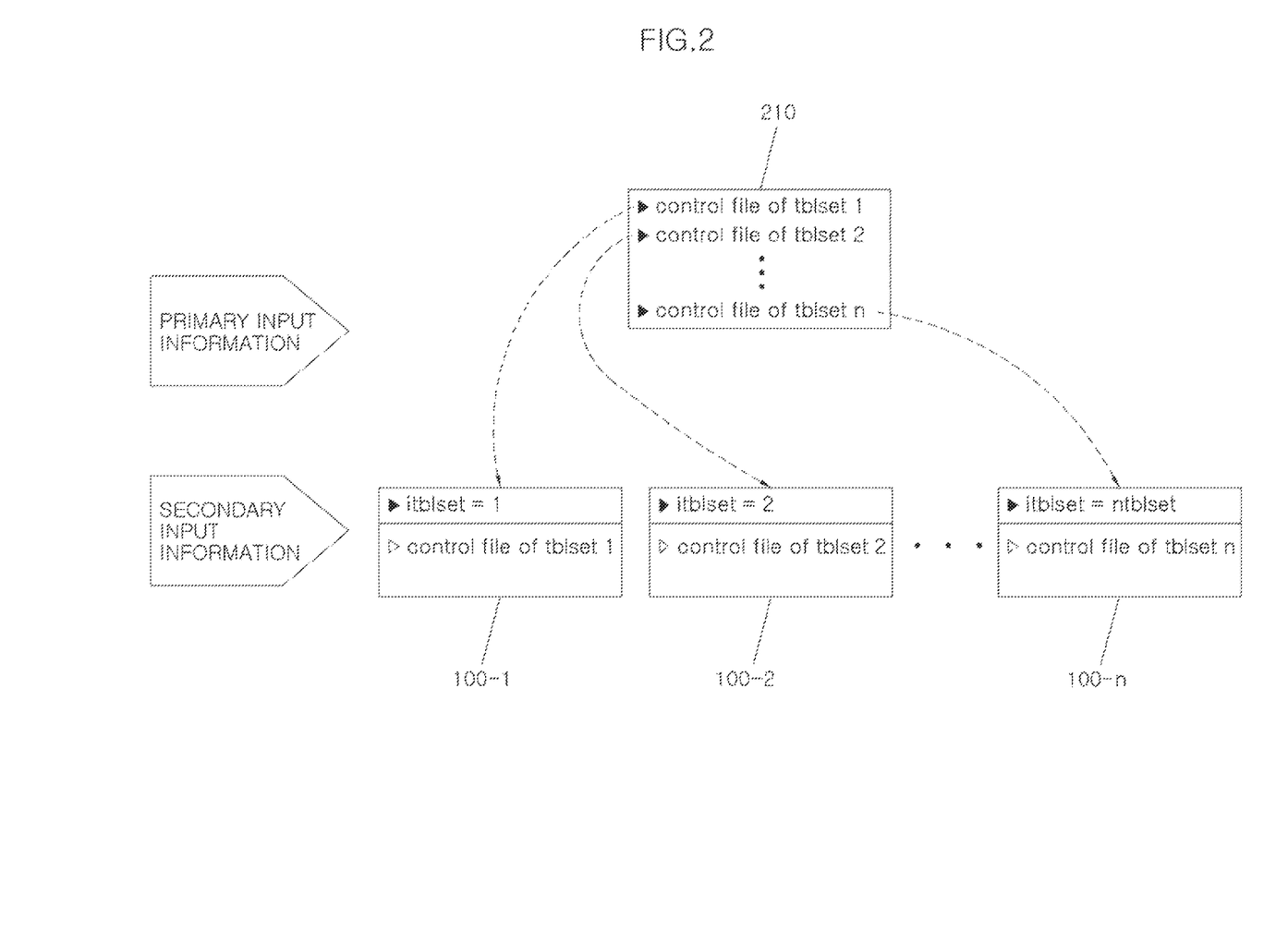
FIG. 2 is a concept diagram that shows the input of hierarchical information about data in the database of FIG. 1.

FIG. 2 is a concept diagram that shows the input of hierarchical data for the database illustrated in FIG. 1. Specifically, FIG. 2 is a view that conceptually shows the input of two levels of hierarchical data. Referring to FIG. 2, the secondary input information for controlling each of the table sets, which corresponds to control files of tblset 1 to n, is located in the second level, and the primary input information in which the pieces of secondary input information are aggregated is located in the first level.

Figure 3A:
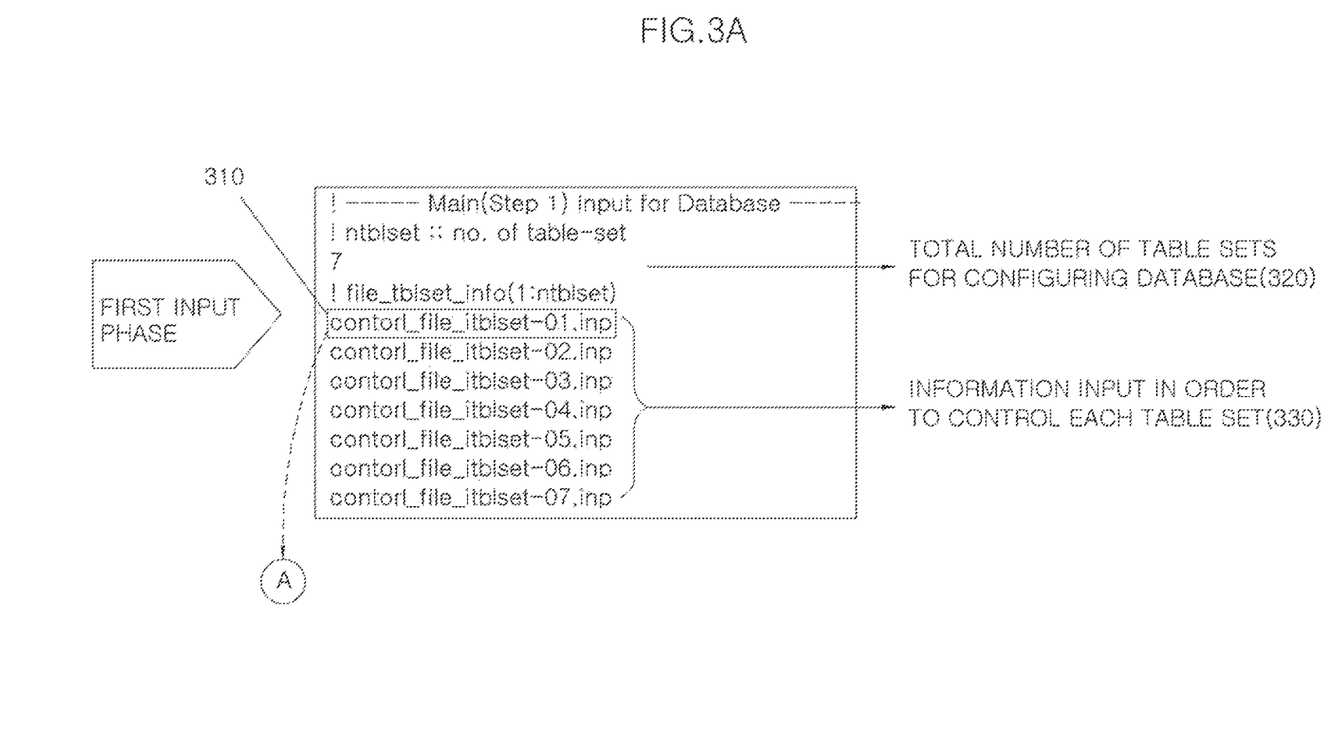
FIGS. 3A, 3B, and 3C show examples in which the information about data according to FIG. 2 is input.
Figure 3B:
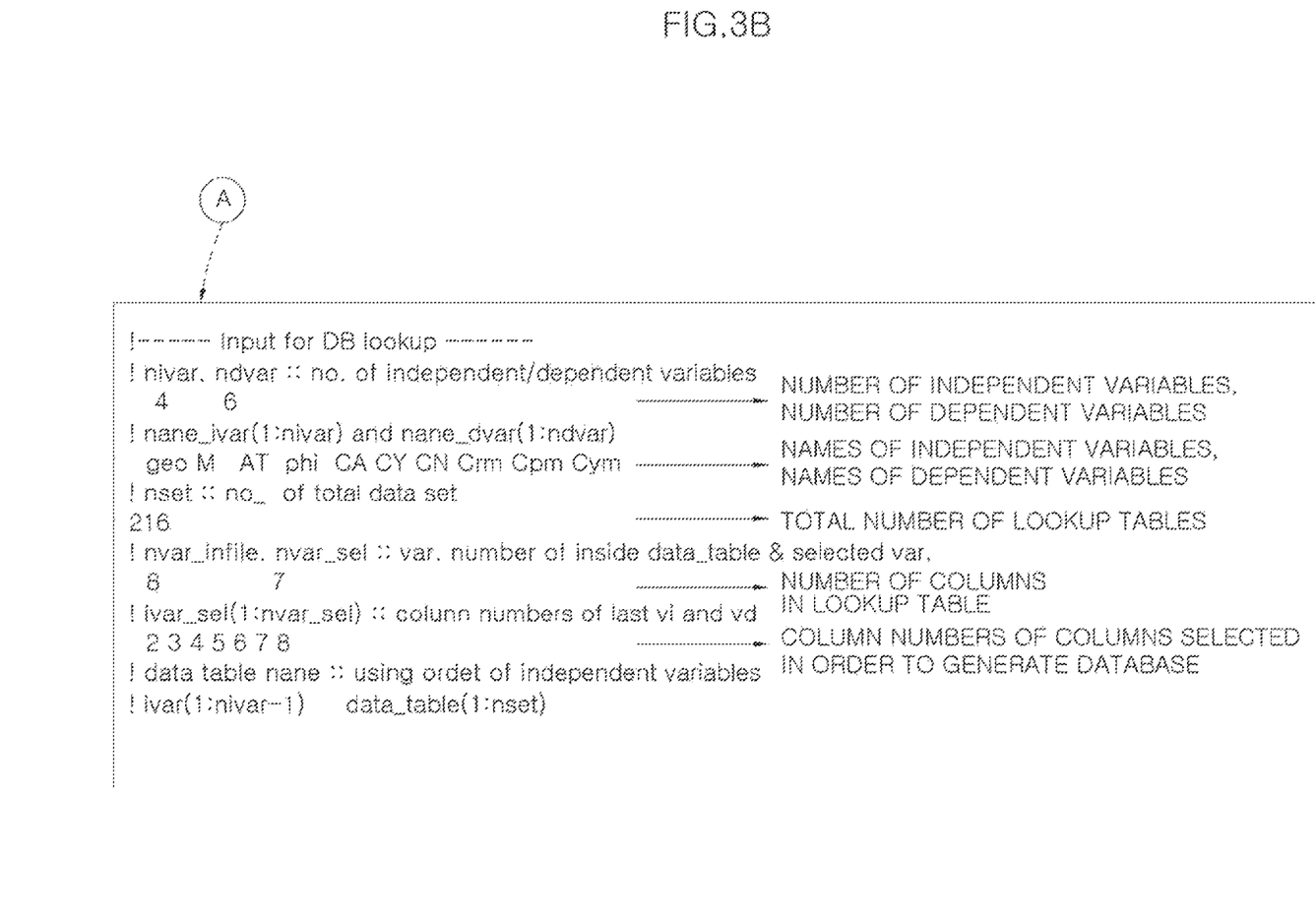
Figure 3C:
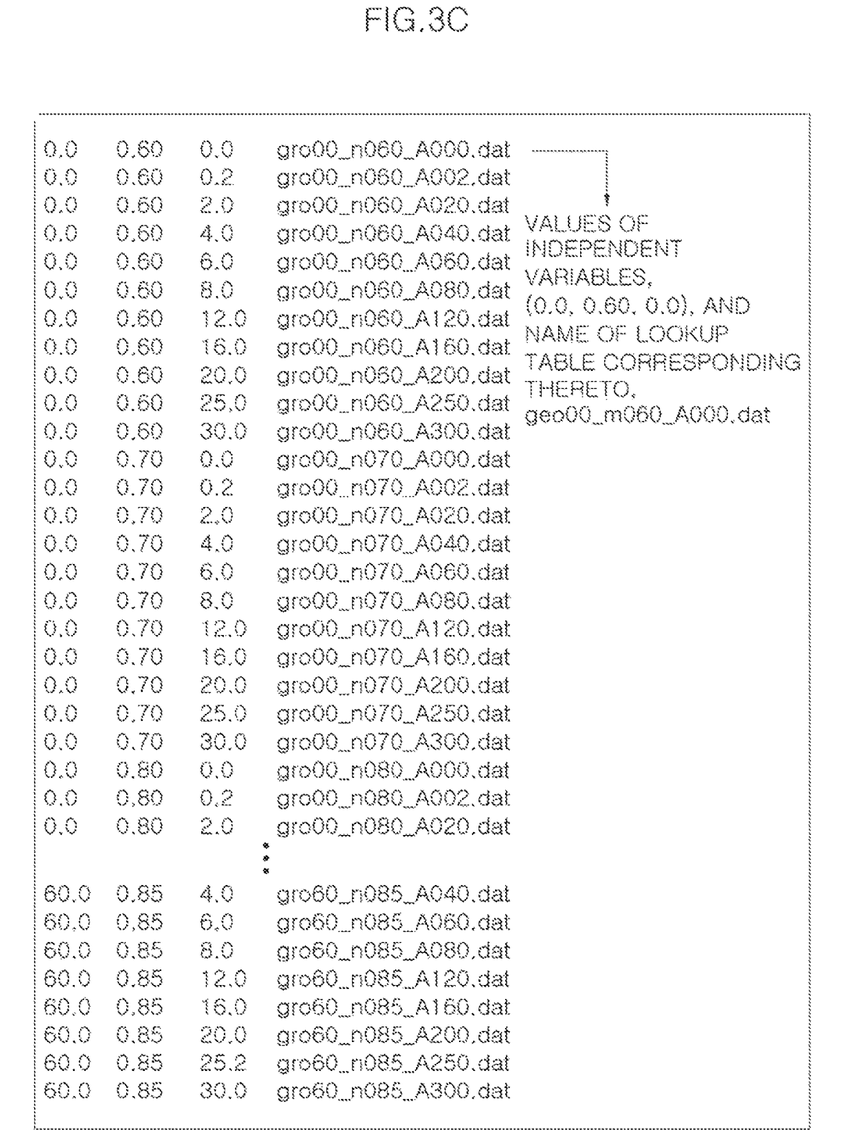
Figure 4A:
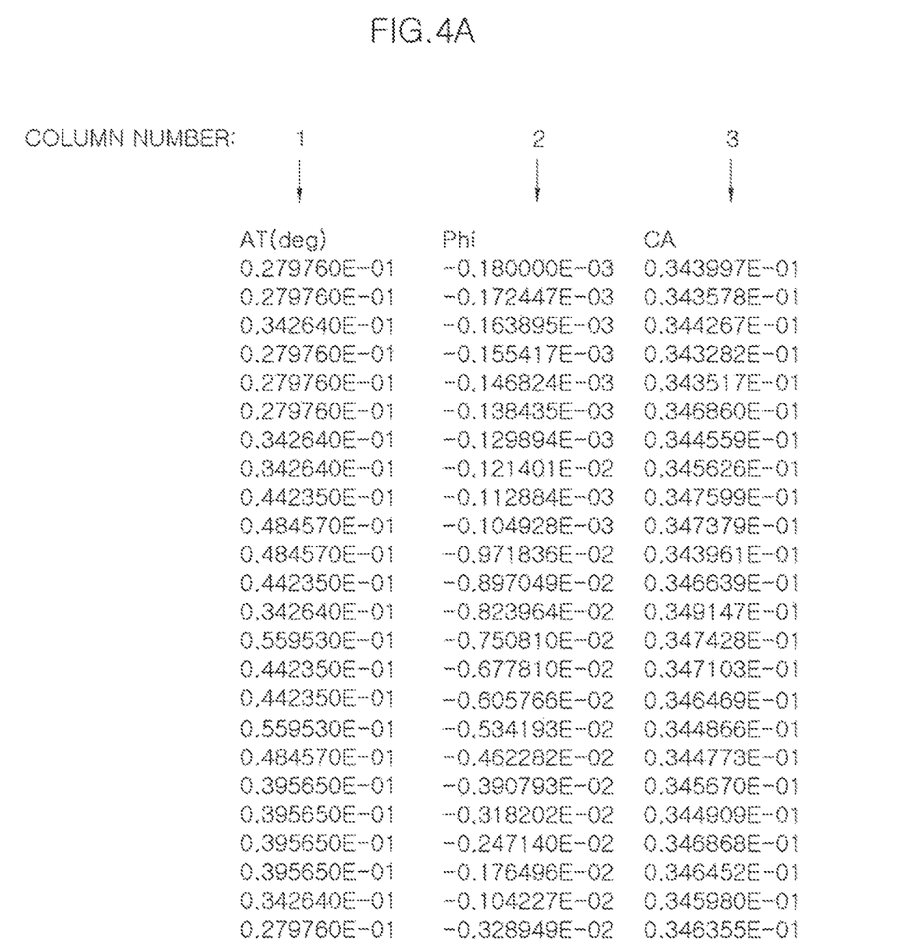
FIGS. 4A, 4B, 4C, 4D, 4E, and 4F show examples of the content of a lookup table according to an embodiment of the present invention.
Figure 4B:
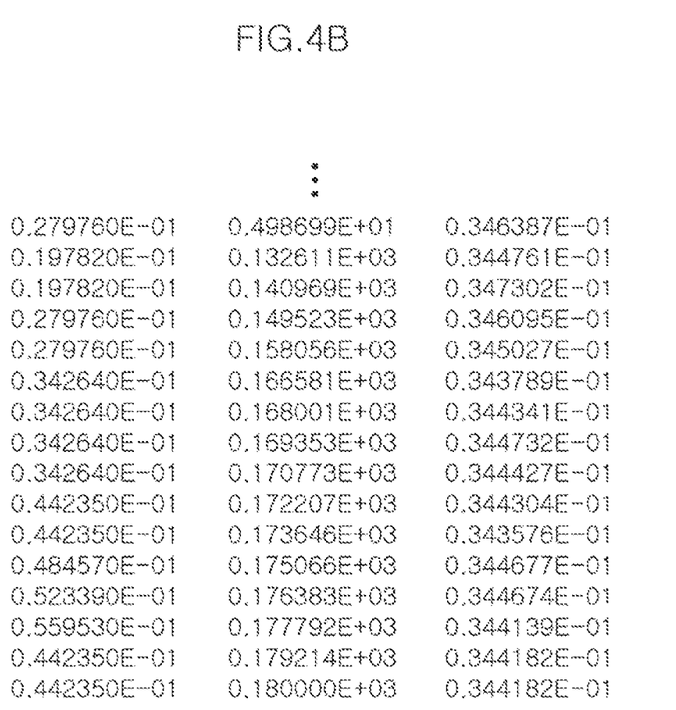
Figure 4C:
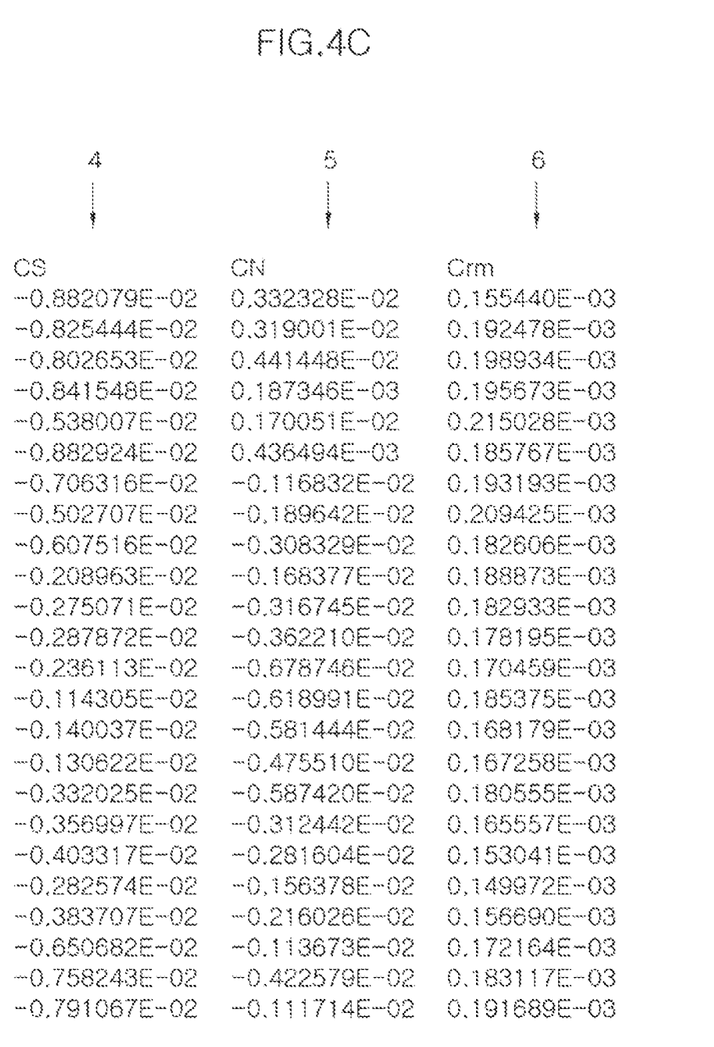
Figure 4D:
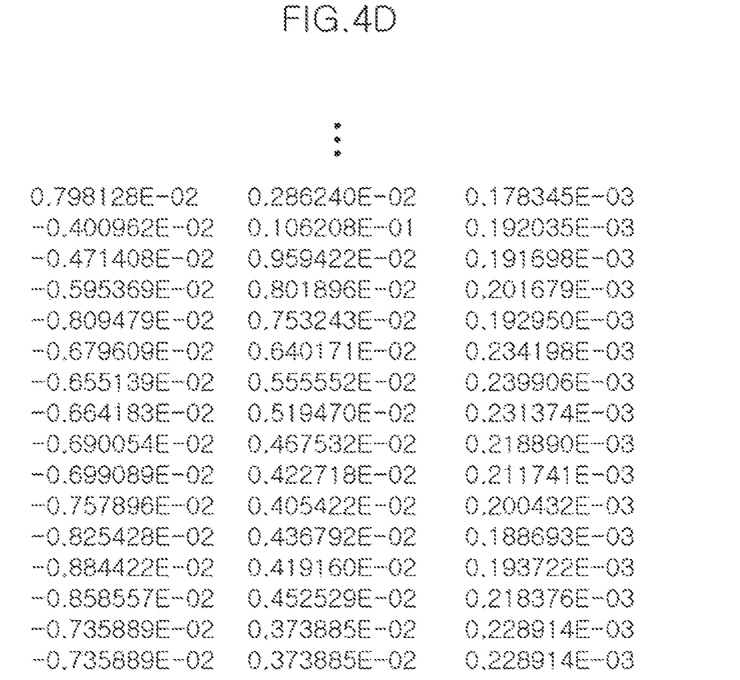
Figure 4E:
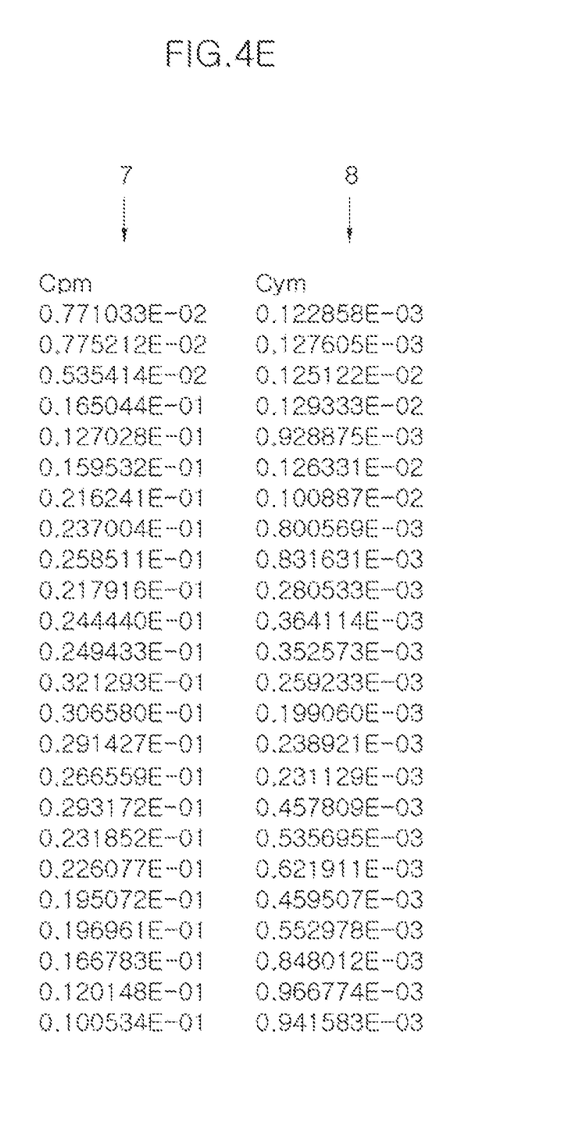
Figure 4F:
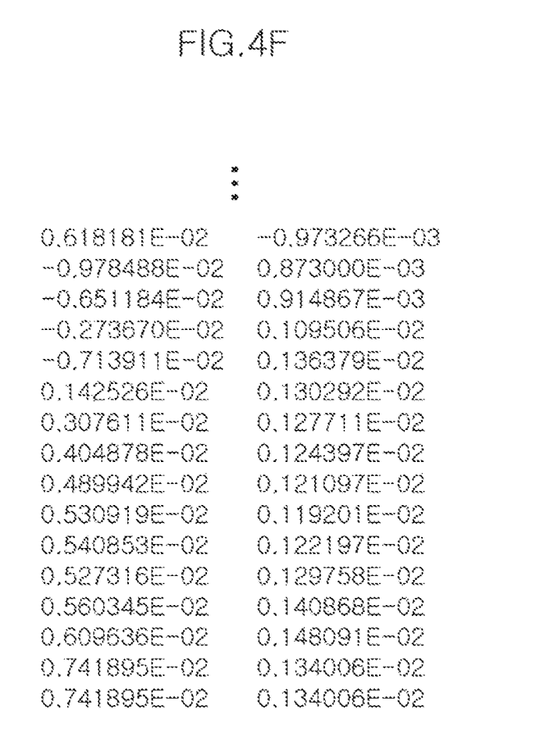

FIGS. 3A, 3B, and 3C are an example a the input of information about data according to FIG. 2. Referring to FIGS. 3A, 3B, and 3C, the database is configured with seven table sets 320, and control infonnation 330 for controlling each a the table sets is represented as "control_file_itblset=01.INP", . . . , "control_file_itblset=07.INP", as shown in the primary input information.

The secondary input information shows the first piece of information, which is referred to as "control_file_itblset=01.INP", among the seven pieces of input information. From the secondary input information, information about the first table set may be confirmed to be the following.

ⓐ There are four independent variables and six dependent variables.

ⓑ The names of the our independent variables are geo, M, AT, and Phi, respectively, and the names of the six dependent variables are CA, CY, CN, Crm, Cpm, and Cym, respectively.

ⓒ The table set includes 216 lookup tables.

ⓓ The lookup table is configured with eight columns, and a total of seven columns are selected therefrom in order to generate a database. The reason why seven columns are selected is that it is necessary to select six dependent variables and the last independent variable in the lookup table.

ⓔ In the lookup table, the column number indicative of the last independent variable is 2, and the dependent variables correspond to the third to eighth columns. In other words, because each of the variables may match a column number, the degree of freedom may be increased when generating lookup tables.

ⓕ When the value of the three independent variables (geo, M, AT), excluding the last independent variable, is (0.0, 0.6, 0.0), the name of the lookup table corresponding thereto is "geo00_m060_A000.dat".

FIGS. 4A, 4B, 4C, 4D, 4E, and 4F are examples that show the content of a lookup table according to an embodiment of the present invention. Specifically, FIGS. 4A, 4B, 4C, 4D, 4E, and 4F show the content of the lookup table that is referred to as "geo00_m060_A000.dat" illustrated in FIGS. 3A, 3B, and 3C. The lookup table contains a total of eight columns. The second column denotes the last independent variable "Phi", and the third to eighth columns respectively denote six dependent variables. The first row of the lookup table contains important information for describing the lookup table, rather than data. As shown in the drawing, if the row that contains information for describing the lookup table (i.e. the first and last rows of the table) may be controlled using an input file, the degree of freedom in the format of the lookup table may be further increased.

Figure 5:
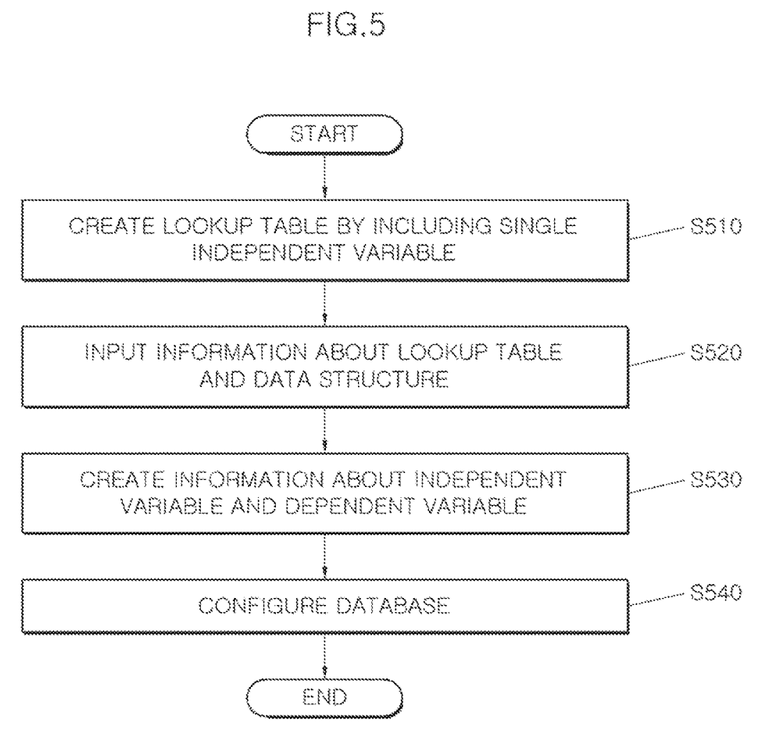
FIG. 5 is a flowchart of the process of generating the structure of a database according to zip embodiment of the present invention.

FIG. 5 is a flowchart that shows the process of generating the structure of a database according to an embodiment of the present invention. Referring to FIG. 5, a lookup table is generated at step S510 by including a single independent variable and all dependent variables therein.

Subsequently, multiple table sets are generated, and control information for controlling each of the multiple table sets is input at step S520.

Subsequently, information about independent variables and dependent variables is generated at step S530, and multiple lookup tables, which have been created in advance using a table lookup method, are input in the control information, whereby the structure of an engineering database is generated at step S540.

Figure 6:
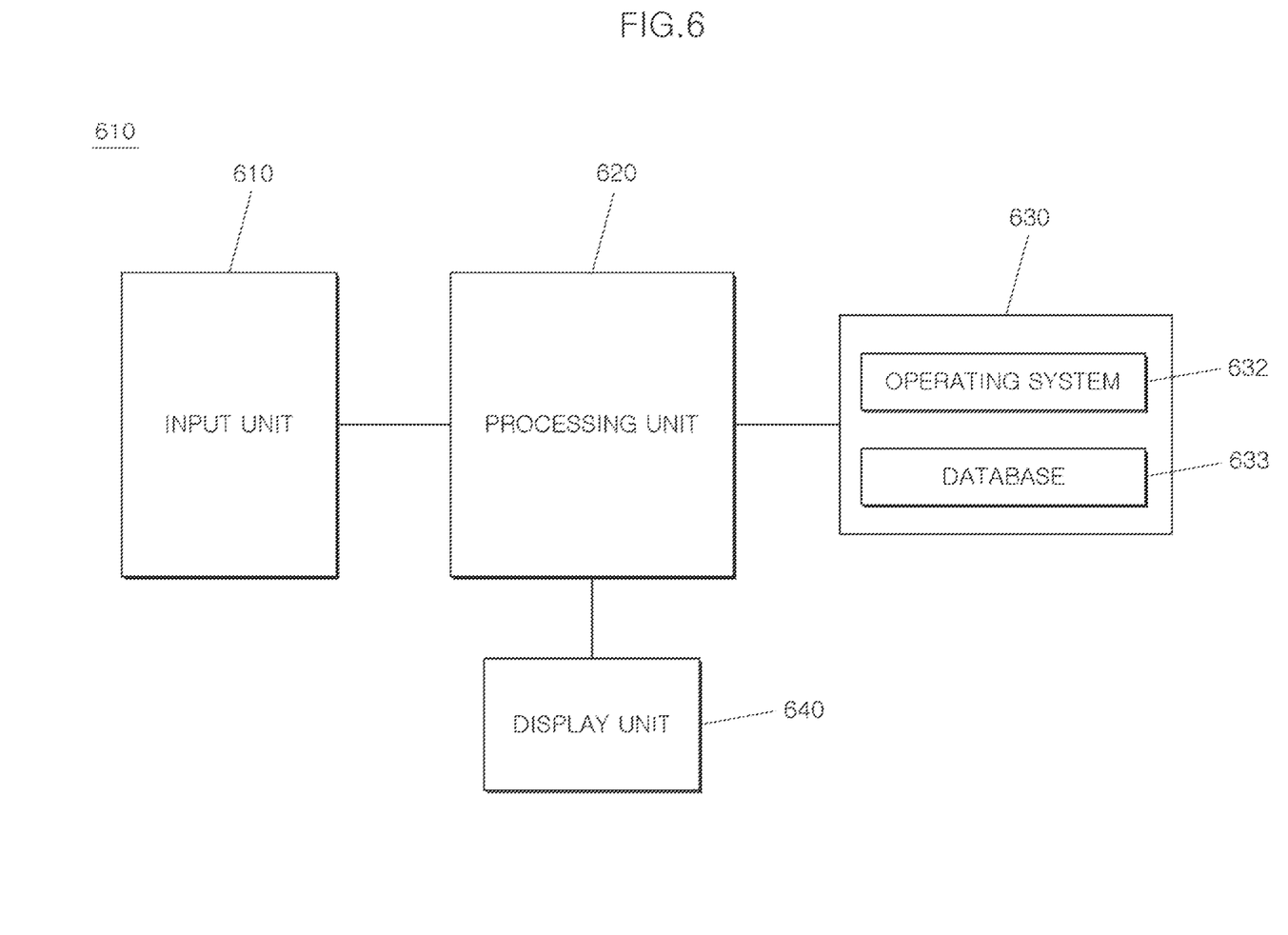
FIG. 6 is a block diagram of a computer device for generating the structure of a database according to an embodiment of the present invention.

FIG. 6 is a block diagram of a computer device for creating a database structure according to an embodiment of the present invention. Referring to FIG. 6, the computer device 600 includes an input unit 610 for handling data and/or user input, a processing unit 620 for processing data and/or input signals, a display unit 640 for displaying the processed data, and a storage unit 630 for storing a database 633 that is created based on the processed data.

The input unit 610 may be a touch screen, a mouse, a keyboard, a microphone, a Liquid Crystal Display (LCD) panel or the like.

The storage unit 630 stores an Operating System (OS) 632 for operating the computer device 600, programs for implementing algorithms for creating an engineering database, data, and the like. Here, the storage unit 630 may be memory within a CPU (not illustrated) or separate memory. Therefore, the storage unit 630 may be configured as a combination of non-volatile memory, such as a Solid State Disk (SSD), a hard disk drive, flash memory, Electrically Erasable Programmable Read-Only Memory (EEPROM), Static RAM (SRAM), Ferro-electric RAM (FRAM), Phasechange RAM (PRAM), Magnetic RAM (MRAM) or the like, and volatile memory, such as Dynamic Random Access Memory (DRAM), Synchronous Dynamic Random Access Memory (SDRAM), Double Data Rate-SDRAM (DDR-SDRRAM) or the like.

The database 633 may be configured as a separate database server.

According to the present invention, when a database is generated using lookup tables and a table lookup method is used. Operations required for interpreting and designing data ma be replaced by the process of indexing and interpolating data in a previously generated database.

Also, the present invention may provide a method for maximizing efficiency by using a table lookup method, which may improve efficiency as operations that are necessary in order to interpret and design data are more complicated and more time-consuming.

Also, the present invention enables the entire structure of a database (i.e., the number and range of independent variables and the kind and number of dependent variables) to be easily checked, and enables data to be easily reviewed, replaced, and updated.

Also, because the present invention enables the structure of a lookup table to be controlled through separate input, the format of the lookup table (i.e. the number and order of rows and columns therein) is not limited, and the table may be freely configured.

Also, in the present invention, because all remaining independent variables, excluding the last independent variable, are separately input, data may be sorted based on each of the independent variables, whereby there is no need to sort data files for each independent variable.

Also, the present invention may enable easy generation of a database when the dependent variables are the same but the kinds of independent variables are different from each other.

What is claimed is:

1. A method for generating an engineering database using lookup tables, the method being implemented by a processor executing instructions stored in a storage unit and comprising:
    creating a plurality of table sets for generating an engineering database;
    inputting a plurality of control information for controlling the table sets; and
    inputting lookup tables corresponding to each of the plurality of control information,
    wherein the lookup tables show data values for a change in one of independent variables,
    wherein the engineering database is of a hierarchical data structure with first and second data levels,
    wherein primary input information in which the plurality of control information are aggregated is presented in the first data level,
    wherein secondary input information including each of the plurality of control information for controlling each of the table sets is presented in the second data level, and
    wherein the primary input information includes:
    a number of the table sets included in the engineering database, and
    names for referring to each of the plurality of control information included in the engineering database.

2. The method of claim 1, wherein each of the lookup tables uses dependent variable values for a change in a single independent variable.

3. The method of claim 1, wherein the secondary input information includes a number of columns contained in each of the lookup table, a number of columns selected from among the columns contained in each of the lookup tables, and column numbers of the selected columns.

4. The method of claim 1, wherein the secondary input information includes the independent variables, a number of and names of variables dependent on the independent variables, and a number of the lookup tables.

5. The method of claim 4, wherein each of the lookup tables is configured with a combination of input information for the independent variables and a name of the lookup table corresponding to the independent variables.

6. A method for generating an engineering database using lookup tables, the method being implemented by a processor executing instructions stored in a storage unit and comprising:
    creating a plurality of table sets for generating an engineering database;
    inputting a plurality of control information for controlling the table sets; and
    inputting lookup tables corresponding to each of the plurality of control information,
    wherein the lookup tables show data values for a change in one of independent variables,
    wherein the engineering database is of a hierarchical data structure with first and second data levels,
    wherein primary input information in which the plurality of control information are aggregated is presented in the first data level,
    wherein secondary input information including each of the plurality of control information for controlling each of the table sets is presented in the second data level, and
    wherein in the second data level, values of remaining ones of the independent variables, excluding the one of the independent variables included in the lookup tables, are arranged along with names of the lookup tables with respect to the lookup tables.

* * * * *